United States Patent [19]

Hisano

[11] Patent Number: 5,095,373
[45] Date of Patent: Mar. 10, 1992

[54] FACSIMILE MACHINE HAVING STORE AND FORWARD MODE

[75] Inventor: Kyosuke Hisano, Atsugi, Japan
[73] Assignee: Ricoh Company, Ltd., Tokyo, Japan
[21] Appl. No.: 501,711
[22] Filed: Mar. 30, 1990

[30] Foreign Application Priority Data

Apr. 10, 1989 [JP] Japan .................................. 1-88036

[51] Int. Cl.[5] ............................................. H04N 1/00
[52] U.S. Cl. ..................................... 358/402; 358/403; 358/440; 358/444; 358/434; 379/100
[58] Field of Search ............... 358/402, 403, 440, 434, 358/438; 379/100

[56] References Cited

U.S. PATENT DOCUMENTS

| | | | |
|---|---|---|---|
| 4,622,592 | 11/1986 | Ikehata et al. | 358/440 |
| 4,646,160 | 2/1987 | Iizuka et al. | 358/402 |
| 4,870,503 | 9/1989 | Miura | 358/440 |

FOREIGN PATENT DOCUMENTS 62-217762 9/1987 Japan .
2089619 6/1982 United Kingdom ................ 358/440

Primary Examiner—Edward L. Coles, Sr.
Attorney, Agent, or Firm—Oblon, Spivak, McClelland, Maier & Neustadt

[57] ABSTRACT

A facsimile machine has a store and forward (SAF) mode and comprises a reader for successively reading a plurality of document pages which are to be transmitted to different destinations in one read operation, a memory for storing image data related to the document pages which are read by the reader, a first designating part for designating a plurality of destinations, a second designating part for arbitrarily designating document pages which are to be transmitted to each of the destinations which are designated by the first designating part, and a transmitting part for making a call out to the destinations one destination at a time and for successively transmitting to each destination the image data which are read out from the memory and are related to the document pages which are to be transmitted to each destination.

12 Claims, 3 Drawing Sheets

FACSIMILE MACHINE HAVING STORE AND FORWARD MODE

BACKGROUND OF THE INVENTION

The present invention generally relates to facsimile machines, and more particularly to a facsimile machine which has a store and forward (SAF) mode.

In the SAF mode, the facsimile machine transmits an image data which is related to a document and is stored in a memory. Conventionally, when transmitting the image data which are related to documents to a plurality of destinations from such a facsimile machine, an operator sets telephone numbers of each of the destinations and then makes a read operation. The read operation includes scanning of the documents and storing the image data related to the scanned documents into a memory. As a result, the facsimile machine stores each of the set destinations and the corresponding image data which are to be transmitted to the destinations. Therefore, it is possible to successively transmit the image data which are related to the documents to the corresponding destinations.

When transmitting a plurality of pages of a document to a plurality of destinations, there are cases where some of the pages of the document needs to be transmitted to all of the destinations. In other words, the same pages making up a part of the document are transmitted to each destination. But in the case of the conventional facsimile machine, the image data are stored for each destination, and the image data which is stored for one particular destination is transmitted as it is for this one particular destination. Accordingly, even when some of the pages of the document need to be transmitted to all of the destinations, the scanning of the document pages is made independently for each destination, and the image data related to the scanned document pages are stored independently for each destination.

For this reason, the conventional facsimile machine suffers from a problem that it takes a long time to scan the document pages and store the image data related to the scanned document pages for each of the destinations. In addition, the image data which are related to the same document page occupy a large memory area of the memory, and there is a problem in that it is impossible to efficiently make use of the memory capacity of the memory.

SUMMARY OF THE INVENTION

Accordingly, it is a general object of the present invention to provide a novel and useful facsimile machine in which the problems described above are eliminated.

Another and more specific object of the present invention is to provide a facsimile machine having a store and forward mode and comprising reading means for successively reading a plurality of document pages which are to be transmitted to different destinations in one read operation, memory means for storing image data related to the document pages which are read by the reading means, first designating means for designating a plurality of destinations, second designating means for arbitrarily designating document pages which are to be transmitted to each of the destinations which are designated by the first designating means, and transmitting means for making a call out to the destinations one destination at a time and for successively transmitting to each destination the image data which are read out from the memory means and are related to the document pages which are to be transmitted to each destination. According to the facsimile machine of the present invention, it is possible to reduce the time it takes to store the image data related to the document pages which are to be transmitted to the different destinations. In addition, one image data is stored at only one location within the memory means, and it is therefore possible to efficiently utilize the memory capacity of the memory means.

Still another object of the present invention is to provide a facsimile machine having a normal store and forward mode and an editing store and forward mode, where the normal store and forward mode is a transmission mode available on an existing facsimile machine in which a destination and document pages which are to be transmitted to the designation are designated independently for each of a plurality of destinations, and comprising selecting means for selecting a transmission mode of the facsimile machine to one of the normal store and forward mode and the editing store and forward mode, reading means for successively reading a plurality of document pages which are to be transmitted to different destinations in one read operation in the editing store and forward mode, memory means for storing image data related to the document pages which are read by the reading means, first designating means for designating a plurality of destinations, second designating means for arbitrarily designating document pages which are to be transmitted to each of the destinations which are designated by the first designating means in the editing store and forward mode, and transmitting means for making a call out to the destinations one destination at a time and for successively transmitting to each destination the image data which are read out from the memory means and are related to the document pages which are to be transmitted to each destination in the editing store and forward mode. According to the facsimile machine of the present invention, it is possible to arbitrarily select the transmission mode from the normal store and forward mode and the editing store and forward mode. :

Other objects and further features of the present invention will be apparent from the following detailed description when read in conjunction with the accompanying drawings.

DESCRIPTION OF THE PREFERRED EMBODIMENTS

Figure 1:
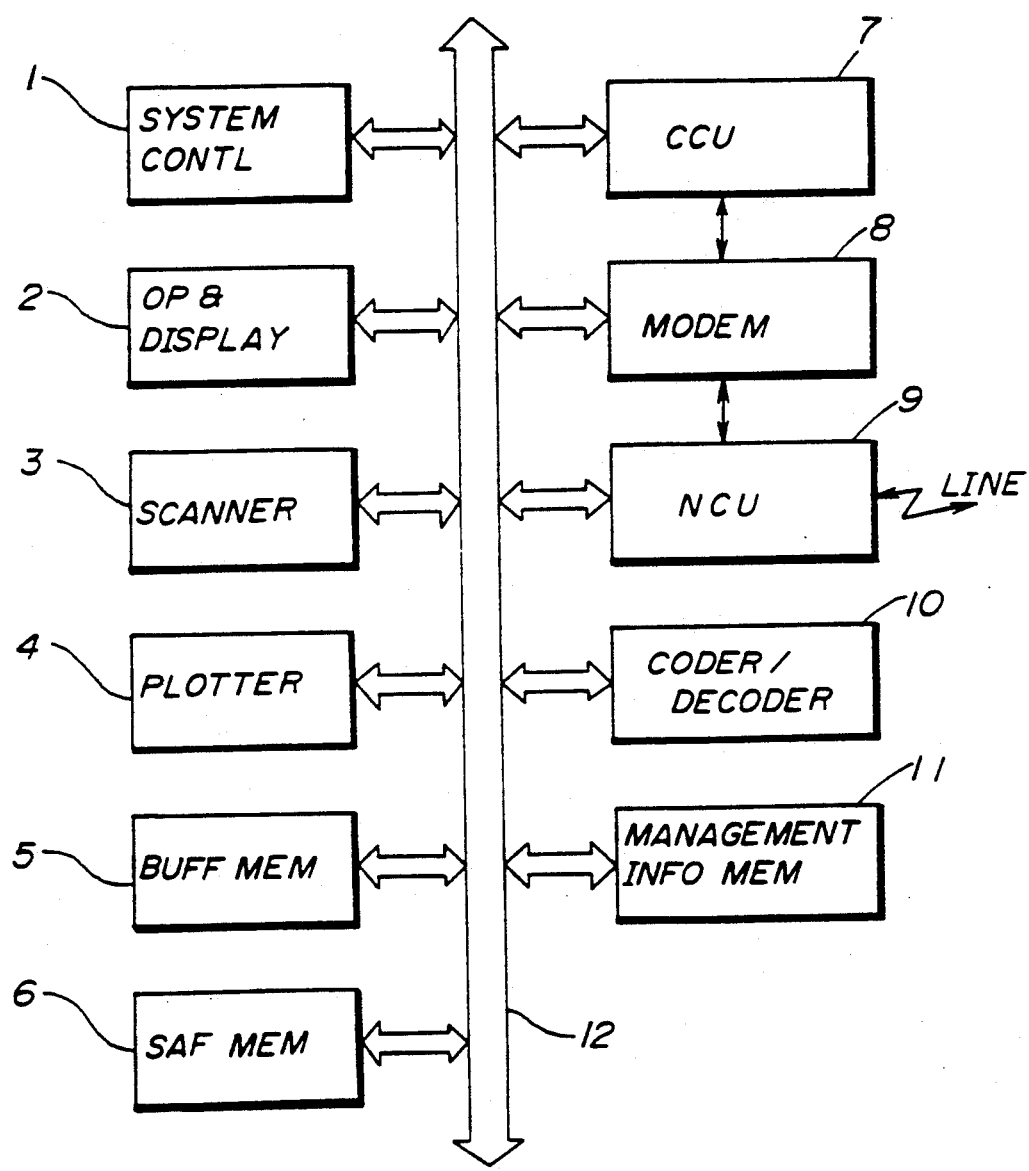
FIG. 1 is a system block diagram showing an embodiment of a facsimile machine according to the present invention.

A description will be given of an embodiment of a facsimile machine according to the present invention. FIG. 1 generally shows the embodiment of the facsimile machine. In FIG. 1, the facsimile machine comprises a system controller 1, an operation and display part 2, a scanner 3, a plotter 4, a buffer memory 5, an SAF memory 6, a communication control unit 7, a modem 8, a network control unit 9, a coder/decoder 10, and a management information memory 11 which are coupled via a system bus 12.

The system controller 1 has an internal central processing unit (CPU) and controls each part of the facsimile machine so as to carry out a communication operation. The operation and display part 2 includes manipulation keys and a display. The manipulation keys are manipulated by an operator when inputting an instruction such as dialing a destination and starting a facsimile transmission. The display is used to display various messages including a message which indicates an operation state of the facsimile machine.

The scanner 3 reads a document and outputs an image data which is related to the read document. The plotter 4 records on a recording sheet an image which is described by an image data which is received from the other party, that is, from another facsimile machine. The buffer memory 5 temporarily stores the image data. The SAF memory 6 stores the image data related to all of the pages of the document which is to be transmitted.

The communication control unit 7 controls the transmission of the image data. The modem 8 transmits and receives procedure signals of a transmission control procedure and also modulates the image data in a transmission mode and demodulates the image data in a reception mode. The network control unit 9 makes a line control with respect to a telephone line in both the transmission and reception modes.

The coder/decoder 10 codes the image data which is read by the scanner 3 and decodes the image data which is received from the other party. The management information memory 11 stores the set contents of a transmission process, storage areas of the SAF memory 6 where the image data are stored and the like.

In addition to the standard operation modes available on an existing facsimile machine, the facsimile machine shown in FIG. 1 has two kinds of SAF modes. The two SAF modes are a normal SAF mode and an editing SAF mode. In the normal SAF mode, the document pages to be transmitted are read and stored independently for each destination and the stored document pages are independently transmitted for each destination similarly to the conventional facsimile machine having the SAF mode. On the other hand, in the editing SAF mode, the document pages to be transmitted are read and stored collectively and the document pages to be transmitted are designated for each destination.

Figure 2:
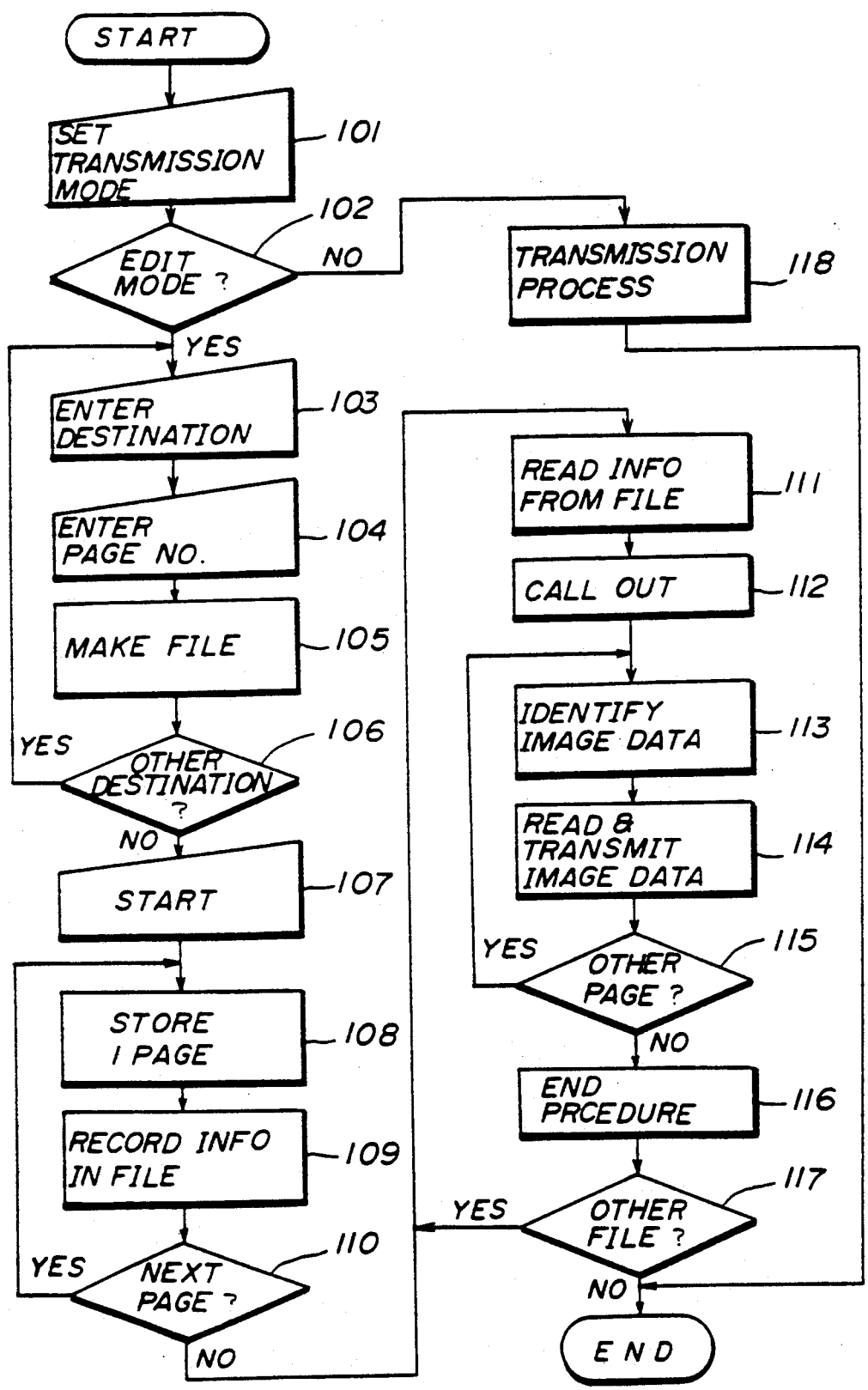
FIG. 2 is a flow chart for explaining an operation of the facsimile machine shown in FIG. 1.

Next, a description will be given of an operation of the facsimile machine shown in FIG. 1, by referring to FIG. 2. FIG. 2 is a flow chart showing the operation of the facsimile machine for controlling the storage and transmission of the image data.

First, an operator sets the facsimile machine to a transmission mode by manipulating keys of the operation and display part 2 in a step 101. For the sake of convenience, it is assumed that the operator sets the facsimile machine to the editing SAF mode so as to transmit a plurality of document pages to a plurality of destinations. In this case, the operator stacks the document pages which are to be transmitted to the plurality of destinations, and confirms the telephone numbers of the destinations and the document pages which are to be transmitted to each of the destinations. For example, it is assumed that the document pages to be transmitted to each of the destinations are as shown in the following Table.

TABLE

| Destination | Document Page |
|---|---|
| A | 1, 4, 5, 6 |
| B | 2, 4, 7 |
| C | 3, 5 |

A step 102 discriminates whether or not the transmission mode is set to the editing SAF mode. In this case, the discrimination result in the step 102 is YES and the operator enters the telephone number of one destination in a step 103. Then, the operator enters the document pages which are to be transmitted to this destination. A step 104 makes a transmission management file within the management information memory 11 when the destination and the document pages are entered. This transmission management file records the input information which includes the destination (telephone number) and the document pages which are to be transmitted to this destination. A step 106 discriminates whether or not there are other destinations to which the document pages are to be transmitted. The steps 103 through 105 are repeated when the discrimination result in the step 106 is YES.

Figure 3:
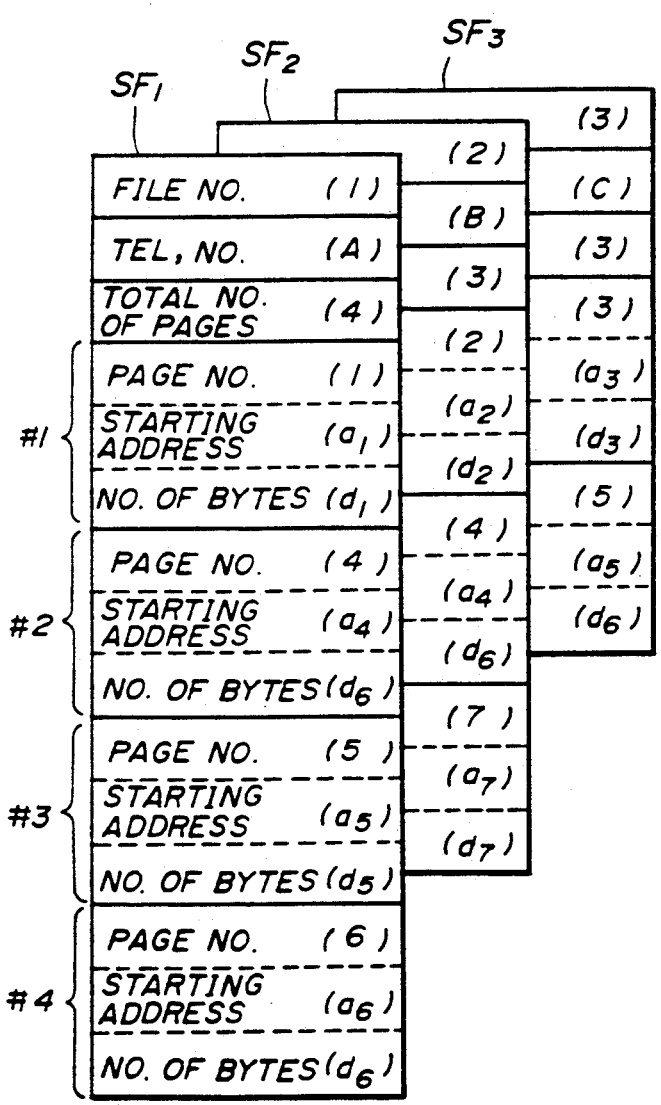
FIG. 3 is a diagram for explaining an embodiment of a content of a transmission management file.

Therefore, a transmission management file is made for each of the destinations. In other words, in the case where the destinations and the document pages which are to be transmitted are as shown in the Table described above, transmission management files SF1 through SF3 shown in FIG. 3 are respectively made for the three destinations A, B and C. The transmission management files SF1 through SF3 each have a file number which is assigned consecutively, a destination telephone number which is entered, a total number n of document pages to be transmitted, and page information areas #1 through #n for storing the image data of n document pages. Each page information area #i (i=1, ..., n) has a page number of the document stored at a header portion. In each page information area #i, the page number is followed by a starting address within the SAF memory 6 and a number of bytes of data which are stored from the starting address for this particular page number.

When the entry is finished for all of the destinations and the discrimination result in the step 106 becomes NO, the operator sets the stacked document pages on the scanner 3 and starts the storage and transmission operation of the facsimile machine by manipulating an appropriate key of the operation and control part 2 in a step 107. As a result, the facsimile machine starts to read the document pages.

Figure 4:
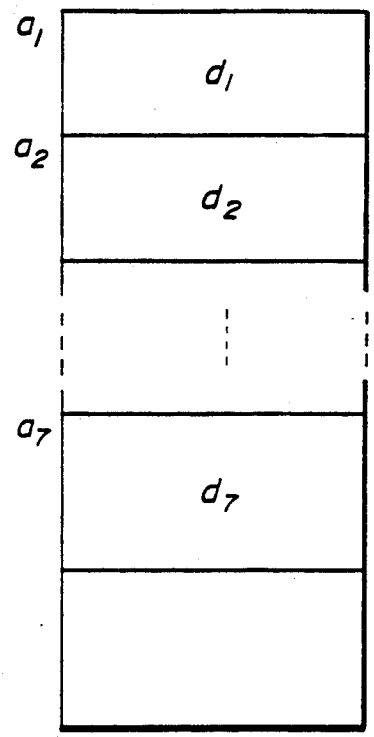
FIG. 4 is a diagram for explaining a stored state of image information in a SAF memory.

First, when the scanner 3 reads the first document page, a step 108 stores the image data related to this first document page in the SAF memory 6. A step 109 records the starting address and the number of bytes of data within the SAF memory 6 for the first document page in the page information area #1 of the corresponding transmission management file SF1. In other words, when the starting address is a1 and the number of bytes of data (that is, the data quantity) is d1 within the SAF memory 6 for the first page as shown in FIG. 4, the starting address a1 and the number of bytes d1 are recorded in the page information area #1 of the transmission management file SF1 as shown in FIG. 3.

A step 110 discriminates whether or not there is another document page to be read on the scanner 3. The steps 108 and 109 are repeated when the discrimination result in the step 110 is YES. In this embodiment, the starting addresses a2 through a7 and the number of bytes d2 through d7 are recorded in the respective page information areas #1 through #n of the corresponding transmission management files SF1 through SF3.

Thereafter, when the discrimination result in the step 110 becomes NO, the transmission process of the facsimile machine starts and a step 111 reads information from one transmission management file. A step 112 makes a call out to the destination telephone number which is included in the information which is read from the transmission management file. When the other party (that is, the destination) answers, a step 113 identifies the image data related to one document page which is to be transmitted from of the image data stored within the SAF memory 6 based on the information read from the page information area of the transmission management file. A step 114 reads the image data related to one document page which is to be transmitted from the SAF memory 6 and transmits the read image data. A step 115 discriminates whether or not there is another document page to be transmitted to the same destination. The steps 113 and 114 are repeated when the discrimination result in the step 115 is YES.

When all of the document pages intended for one destination are transmitted and the discrimination result in the step 1!5 becomes NO, a step 116 carries out a predetermined transmission control procedure to end the communication. Then, a step 117 discriminates whether or not there is another transmission management file, that is, another destination to which the document pages are to be transmitted. The steps 111 through 116 are repeated in a similar manner when the discrimination result in the step 117 is YES.

Therefore, in this embodiment, the document pages are successively transmitted to the three destinations A, B and C by using the information recorded in the respective transmission management files SF1, SF2 and SF3. When the transmission of the document pages is completed for all of the destinations, the discrimination result in the step 117 becomes NO and the transmission operation ends.

Next, when making the facsimile transmission in the normal SAF mode, the operator sets the facsimile machine to the normal SAF mode by manipulating an appropriate key of the operation and display part 2. In this case, the discrimination result in the step 102 becomes NO. Hence, a step 118 makes a transmission process similarly to the conventional facsimile machine having the SAF mode. In other words, the operator enters the destination telephone number and sets the document pages on the scanner 3 so as to store the image data related to the document pages which are to be transmitted independently for each of the destinations, and then starts the transmission process. As a result, the facsimile machine successively calls out the destinations and successively transmits the corresponding document pages to the destinations.

According to this embodiment, all of the document pages which are to be transmitted to the different destinations are read in one read operation and the image data related to the read document pages are stored in the SAF memory 6. When the operator sets the destinations and the designates the document pages which are to be transmitted for each destination, it becomes possible to arbitrarily transmit the same document pages to a plurality of destinations. For this reason, there is no need to independently read the document pages and store the image data related to the read document pages independently for each destination, and it is possible to considerably reduce the time it takes to carry out the process of storing the image data of the read document pages. In addition, because the one image data is stored at only one location within the SAF memory 6, it is possible to efficiently utilize the memory capacity of the SAF memory 6.

In the described embodiment, the image data are transmitted immediately after the image data are stored in the SAF memory 6. However, it is possible to designate the time when the document pages are to be transmitted to each of the destinations using a known time designating function of the conventional facsimile machine.

Further, the present invention is not limited to these embodiments, but various variations and modifications may be made without departing from the scope of the present invention.

What is claimed is:

1. A facsimile machine having a store and forward mode and comprising:

reading means for successively reading a plurality of document pages which are to be transmitted to different destinations in one read operation;

first memory means for storing image data related to the document pages which are read by said reading means;

first designating means for designating a plurality of destinations;

second designating means for arbitrarily designating document pages which are to be transmitted to each of the destinations which are designated by said first designating means; and transmitting means for making a call out to the destinations one destination at a time and for successively transmitting to each destination the image data which are read out from said first memory means and are related to the document pages which are to be transmitted to each destination.

2. The facsimile machine as claimed in claim 1 which further comprises second memory means for storing at least the destinations and the document pages which are designated by said first and second designating means, said transmitting means making the call out to the destinations by reading the destinations from said second memory means and transmitting the image data to each destination by reading the document pages from said second memory means.

3. The facsimile machine as claimed in claim 2 wherein said second memory means stores the destinations and the document pages in a form of a file which is made for each destination.

4. The facsimile machine as claimed in claim 3 wherein said file includes for each document page an address of a corresponding image data which is stored in said first memory means and a data quantity of this corresponding image data.

5. The facsimile machine as claimed in claim 1 which further comprises an operation and display part including manipulation keys and a display, said operation and display part including said first and second designating means.

6. The facsimile machine as claimed in claim 1 wherein said transmitting means includes a system controller, a communication control unit, a modem, a network control unit and a coder/decoder which are coupled via a system bus, said network control unit being coupled to a telephone line.

7. A facsimile machine having a normal store and forward mode and an editing store and forward mode, said normal store and forward mode being a transmission mode available on an existing facsimile machine in which a destination and document pages which are to be transmitted to the designation are designated independently for each of a plurality of destinations, said facsimile machine comprising:

selecting means for selecting a transmission mode of the facsimile machine to one of the normal store and forward mode and the editing store and forward mode;

reading means for successively reading a plurality of document pages which are to be transmitted to different destinations in one read operation in the editing store and forward mode;

first memory means for storing image data related to the document pages which are read by said reading means;

first designating means for designating a plurality of destinations;

second designating means for arbitrarily designating document pages which are to be transmitted to each of the destinations which are designated by said first designating means in the editing store and forward mode; and transmitting means for making a call out to the destinations one destination at a time and for successively transmitting to each destination the image data which are read out from said first memory means and are related to the document pages which are to be transmitted to each destination in the editing store and forward mode.

8. The facsimile machine as claimed in claim 7 which further comprises second memory means for storing at least the destinations and the document pages which are designated by said first and second designating means in the editing store and forward mode, said transmitting means in the editing store and forward mode making the call out to the destinations by reading the destinations from said second memory means and transmitting the image data to each destination by reading the document pages from said second memory means.

9. The facsimile machine as claimed in claim 8 wherein said second memory means stores the destinations and the document pages in a form of a file which is made for each destination.

10. The facsimile machine as claimed in claim 9 wherein said file includes for each document page an address of a corresponding image data which is stored in said first memory means and a data quantity of this corresponding image data.

11. The facsimile machine as claimed in claim 7 which further comprises an operation and display part including manipulation keys and a display, said operation and display part including said selecting means and said first and second designating means.

12. The facsimile machine as claimed in claim 7 wherein said transmitting means includes a system controller, a communication control unit, a modem, a network control unit and a coder/decoder which are coupled via a system bus, said network control unit being coupled to a telephone line.

* * * * *